(12) United States Patent
Jokiranta et al.

(10) Patent No.: US 10,710,086 B2
(45) Date of Patent: Jul. 14, 2020

(54) SPRING TIGHTENING DEVICE, JAW CRUSHER, PROCESSING PLANT OF MINERAL MATERIAL AND METHOD FOR COMPRESSING OR DECOMPRESSING SPRING LOADING TIE ROD IN JAW CRUSHER

(71) Applicant: Metso Minerals, Inc., Helsinki (FI)

(72) Inventors: Jukka Jokiranta, Lempäälä (FI); Aleksi Rikkonen, Tampere (FI)

(73) Assignee: Metso Minerals, Inc., Helsinki (FI)

( * ) Notice: Subject to any disclaimer, the term of this patent is extended or adjusted under 35 U.S.C. 154(b) by 560 days.

(21) Appl. No.: 15/100,848

(22) PCT Filed: Nov. 28, 2014

(86) PCT No.: PCT/FI2014/050928
§ 371 (c)(1),
(2) Date: Jun. 1, 2016

(87) PCT Pub. No.: WO2015/082764
PCT Pub. Date: Jun. 11, 2015

(65) Prior Publication Data
US 2016/0303570 A1    Oct. 20, 2016

(30) Foreign Application Priority Data

Dec. 5, 2013    (FI) .................................... 20136228

(51) Int. Cl.
*B02C 1/06*    (2006.01)
*B02C 1/02*    (2006.01)
(Continued)

(52) U.S. Cl.
CPC ................ *B02C 1/025* (2013.01); *B02C 1/02* (2013.01); *B02C 1/04* (2013.01); *B02C 1/06* (2013.01); *F16F 1/121* (2013.01)

(58) Field of Classification Search
CPC .. B02C 1/02; B02C 1/025; B02C 1/04; B02C 1/06
(Continued)

(56) References Cited

U.S. PATENT DOCUMENTS 1,491,430 A * 4/1924 Stebbins ................. B02C 1/043
241/266
1,972,096 A * 9/1934 Guest ...................... B02C 1/025
241/217
(Continued)

FOREIGN PATENT DOCUMENTS

CN    201361560 Y    12/2009
CN    202146795 U    2/2012
(Continued)

OTHER PUBLICATIONS

Office Action for Japanese Patent Application No. 2016-535238 dated Aug. 21, 2018.
(Continued)

*Primary Examiner* — Adam J Eiseman
*Assistant Examiner* — Bobby Yeonjin Kim
(74) *Attorney, Agent, or Firm* — Andrus Intellectual Property Law, LLP (57) ABSTRACT

A method for compressing or decompressing a spring loading a tie rod in a jaw crusher. The tie rod is supported by, at one location, a pendulum of the jaw crusher and, at another location, the jaw crusher's frame through the said spring. The spring is installed between the jaw crusher's frame and a second spring support supported by the tie rod; and the second spring support is moved in relation to the tie rod. A support part of the tightening device and at least two moving screws supported by the support part are arranged to influence the second spring support. The support part is supported by the tie rod through a locking member; and the at
(Continued)

least two moving screws supported by the support part are moved to change the distance between the second spring support and the support part.

10 Claims, 4 Drawing Sheets

(51) Int. Cl.
*B02C 1/04* (2006.01)
*F16F 1/12* (2006.01)

(58) Field of Classification Search
USPC .................................. 241/262–269, 101.73
See application file for complete search history.

(56) References Cited

U.S. PATENT DOCUMENTS

| | | | | |
|---|---|---|---|---|
| 2,131,801 A | * | 10/1938 | Gruender | B02C 1/06 241/140 |
| 2,598,942 A | * | 6/1952 | Rumpel | B02C 1/04 241/217 |
| 2,921,750 A | * | 1/1960 | Picalarga | B02C 1/04 241/267 |
| 3,153,512 A | * | 10/1964 | Polzin | B02C 1/10 241/219 |
| 3,318,540 A | * | 5/1967 | Gilbert | B02C 1/02 241/217 |
| 4,181,266 A | | 1/1980 | Georget et al. | |
| 4,509,699 A | * | 4/1985 | Tanaka | B02C 1/10 241/268 |
| 5,799,888 A | * | 9/1998 | Hamaguchi | B02C 1/025 241/259.1 |
| 6,116,530 A | * | 9/2000 | Altmayer | B02C 1/025 241/264 |
| 7,344,097 B2 | * | 3/2008 | Young | B02C 1/025 241/268 |
| 8,905,337 B2 | * | 12/2014 | Eriksson | B02C 1/025 241/268 |
| 2016/0303569 A1 | * | 10/2016 | Jokiranta | B02C 1/02 |

FOREIGN PATENT DOCUMENTS

| | | |
|---|---|---|
| CN | 103008045 A | 4/2013 |
| EP | 1908983 | 4/2008 |
| GB | 1569321 | 6/1980 |
| GB | 2444218 | 5/2008 |
| JP | S5339212 U1 | 4/1978 |
| JP | S58174246 | 11/1983 |
| JP | S5961845 U1 | 4/1984 |
| JP | 2003211014 A | 7/2003 |

OTHER PUBLICATIONS

Office Action for Chinese Patent Application No. 201480066537.6 dated Nov. 27, 2017.
Office Action for Finnish Priority Application No. 20136228 dated Aug. 8, 2014.
International Search Report for International Application No. PCT/FI2014/050928 dated Feb. 20, 2015.
Written Opinion for International Application No. PCT/FI2014/050928 dated Feb. 20, 2015.
Notice of Allowance for Japanese Patent Application No. 2016-535238 dated Mar. 28, 2019.

* cited by examiner

SPRING TIGHTENING DEVICE, JAW CRUSHER, PROCESSING PLANT OF MINERAL MATERIAL AND METHOD FOR COMPRESSING OR DECOMPRESSING SPRING LOADING TIE ROD IN JAW CRUSHER

CROSS-REFERENCE TO RELATED APPLICATIONS

This application claims priority to PCT/FI2014/050928, filed Nov. 28, 2014, and published in English on Jun. 11, 2015 as publication number WO 2015/082764, which claims priority to FI Application No. 20136228, filed Dec. 5, 2013, incorporated herein by reference.

TECHNICAL FIELD

The invention is related to the tightening of a spring loading a tie rod in a jaw crusher of mineral material.

BACKGROUND

Mineral material, such as rock, can be extracted from the ground for crushing by means of either explosions or excavation. The rock may also be natural stone and gravel, or construction waste. Both mobile crushers and stationary crushing applications are used for crushing. The material to be crushed is fed with an excavator or wheel loader to a feed hopper of a crusher or crushing plant, from where the material to be crushed may fall into the throat of the crusher, or a feeder transfers the rock material towards the crusher. The mineral material to be crushed may also be recyclable material, such as concrete, bricks, or asphalt.

Jaw crushers are suitable for, for example, rough crushing at quarries or crushing of construction material. According to the operating principle of the jaw crusher, crushing takes place against jaws, termed fixed and moving jaw.

In a known jaw crusher, side plates of the jaw crusher's frame support an upper end of a pendulum through an eccentric. A rear part of the jaw crusher's frame is fastened between the side plates. Below the eccentric, the pendulum is supported by the rear part of the frame through a toggle plate. A tie rod is arranged between a lower part of the pendulum and the rear part of the frame; the tie rod is spring-loaded and pulls the pendulum backwards towards the toggle plate. The spring influencing the tie rod is tightened with a nut influencing the spring; the nut is moved along a thread formed in the tie rod. Tightening the spring is difficult and requires large force and tools.

The purpose of the invention is to avoid or mitigate problems related to prior art and/or offer new technical alternatives.

SUMMARY

According to a first aspect of the invention, a method is provided for compressing or decompressing a spring loading a tie rod in a jaw crusher; the tie rod is supported, at one location, by a pendulum of the jaw crusher and, at another location, by the jaw crusher's frame through the said spring; and the spring is installed at a first section of the spring against a first spring support fastened to the jaw crusher's frame, and at another section of the spring against a second spring support supported by the tie rod, in which method:
the second spring support is moved in relation to the tie rod;
the second spring support is influenced by a support part of a tightening device and at least two moving screws supported by the support part;
the support part is supported by the tie rod through a locking member; and
the distance between the second spring support and the support part is changed by rotating the at least two moving screws supported by the support part.

Preferably, the moving screws are rotated alternately.

Preferably, the movement of the support part farther away from the first spring support is prevented by the locking member fastened to the tie rod.

Preferably, a female thread to be fastened to a thread formed in the tie rod is arranged as the locking member of the support part.

Preferably, the said female thread is arranged in the support part or a separate locking part, such as a nut.

Preferably, a thread is arranged in the support part for each moving screw supported by the support part, or the support part supports a nut for each moving screw supported by the support part, and the moving screw is moved in the thread of the support part or the nut.

Preferably, a spacer plate is arranged between the second spring support and the at least two moving screws supported by the support part.

Preferably, a guide bushing fastened to the second spring support supports the second spring support in relation to the tie rod.

Preferably, when the spring is compressed, the moving screws are rotated in a first direction for a distance required by the compression of the spring.

Preferably, the moving screw is rotated for that long that the compression required of the spring is produced.

Preferably, when the spring is compressed, it is ensured that the moving screws have a sufficient moving distance in a front direction of the movement range for compressing the spring; after the support part is installed, the nut arranged as the locking member is rotated in the thread formed at an end of the tie rod until the compression of the spring starts.

Preferably, when the spring is decompressed, the moving screws are rotated in a second, opposite direction for a distance required by the decompression of the spring. Preferably, the nut is rotated off the tie rod to release the spring.

Preferably, the diameter of the thread of the moving screw is smaller than the diameter of the thread of the locking member.

Preferably, the tie rod is arranged inside the first spring support, the spring, the second spring support, and the support part placed in succession.

According to a second aspect of the invention, a spring tightening device is provided for compressing and decompressing a spring loading a tie rod in a jaw crusher; the tightening device comprises a second spring support supportable by the spring; and the tightening device comprises a support part; at least two moving screws supported by the support part and arranged to influence the second spring support; and a locking member to support the support part by means of the tie rod; and the distance between the second spring support and the support part is arranged to be changeable by rotating the at least two moving screws supported by the support part.

Preferably, space is provided for the tie rod inside the second spring support and the support part placed in succession.

Preferably, the tightening device comprises a female thread as the locking member formed in the support part or a separate locking part such as a nut.

Preferably, the tightening device comprises threads for moving each moving screw supported by the support part in relation to the support part; the threads are arranged in the support part or a nut supported by the support part.

Preferably, the tightening device comprises a spacer plate between the second spring support and the at least two moving screws supported by the support part.

Preferably, the tightening device comprises a tie rod guide bushing fastened to the second spring support.

Preferably, two; or three; or four; or five moving screws are arranged in the support part.

Preferably, the diameter of the thread of the moving screw is smaller than the diameter of the thread of the locking member.

Preferably, the length of the moving screw is chosen so that the moving distance of the moving screw from a rear position to a front position causes the compression required of the spring.

According to a third aspect of the invention, a jaw crusher is provided that comprises:
- a pendulum;
- a toggle plate arranged to support the pendulum by means of the jaw crushers frame;
- a tie rod;
- the tie rod being fastened between the pendulum and the jaw crushers frame;
- a spring for loading the tie rod and pulling the pendulum with the tie rod against the toggle plate;
- a first spring support fastened to the jaw crusher's frame;
- the said spring being installed at a first section of the spring against the first spring support; and
- a tightening device that comprises:
  - a second spring support against which a second section of the spring is installed, the tightening device comprising a support part;
  - at least two moving screws supported by the support part and arranged to influence the second spring support; and
  - a locking member to support the support part by means of the tie rod;
  - and the distance between the second spring support and the support part is arranged to be changeable by rotating the at least two moving screws supported by the support part.

Preferably, the jaw crusher comprises a spring tightening device according to some aspect or embodiment of the invention.

According to a fourth aspect of the invention, a processing plant of mineral material is provided that comprises a jaw crusher according to some aspect or embodiment of the invention.

Preferably, the processing plant of mineral material is a mobile processing plant.

Various embodiments of the present invention will only be or have only been described in connection with one or some of the aspects of the invention. A person skilled in the art will appreciate that any embodiment of an aspect of the invention may be applied in the same aspect and other aspects alone or in combination with other embodiments.

BRIEF DESCRIPTION OF THE FIGURES

The invention will be described in the following by way of example with reference to the appended drawings.

DETAILED DESCRIPTION

In the following description, like references refer to similar parts. It should be noted that the figures are not to scale in all cases and that they mainly serve the purpose of illustrating embodiments of the invention.

Figure 1:
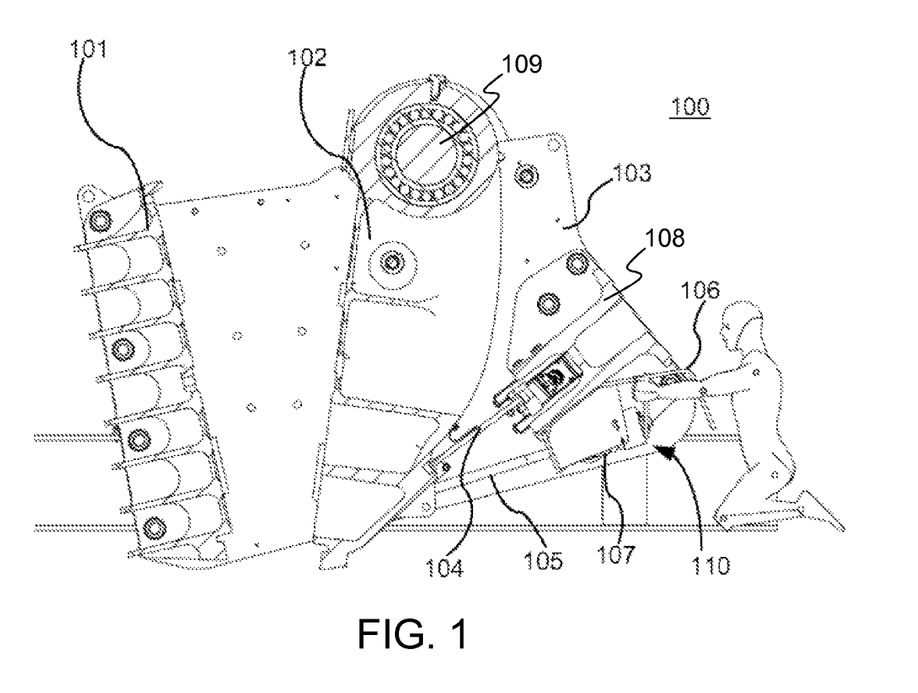
FIG. 1 shows a longitudinal cross-section of a jaw crusher in which a spring of a pendulum's tie rod is tightened with a tightening device according to the invention.

FIG. 1 shows a jaw crusher 100 that comprises a fixed jaw 101 as a front part of the jaw crusher and a pendulum 102, preferably supported at its upper end by side plates 103 of the jaw crusher's frame through an eccentric 109. A rear part 108 of the jaw crusher's frame is fastened between the side plates. The pendulum is supported by the rear part of the frame through a toggle plate 104. In addition, a tie rod 105 is arranged between a lower end of the pendulum and the rear part 108 of the frame; the tie rod is loaded by a spring 107. When the spring 107 is tightened, the tie rod pulls the pendulum 102 backwards against the toggle plate 104. The spring influencing the tie rod is installed in place with a tightening device 110 according to a preferred embodiment of the invention. The jaw crusher comprises a protective structure 106 placed between the tightening device and the user. Preferably, the protective structure comprises a protective plate fastened to the rear part 108. Preferably, the protective structure is arranged to protect the user positioned behind the tightening device from uncontrollably moving objects from the direction of the tightening device. Preferably, the protective structure 106 allows the user to manually use tools to compress and decompress the spring with the tightening device 110.

Figure 2:
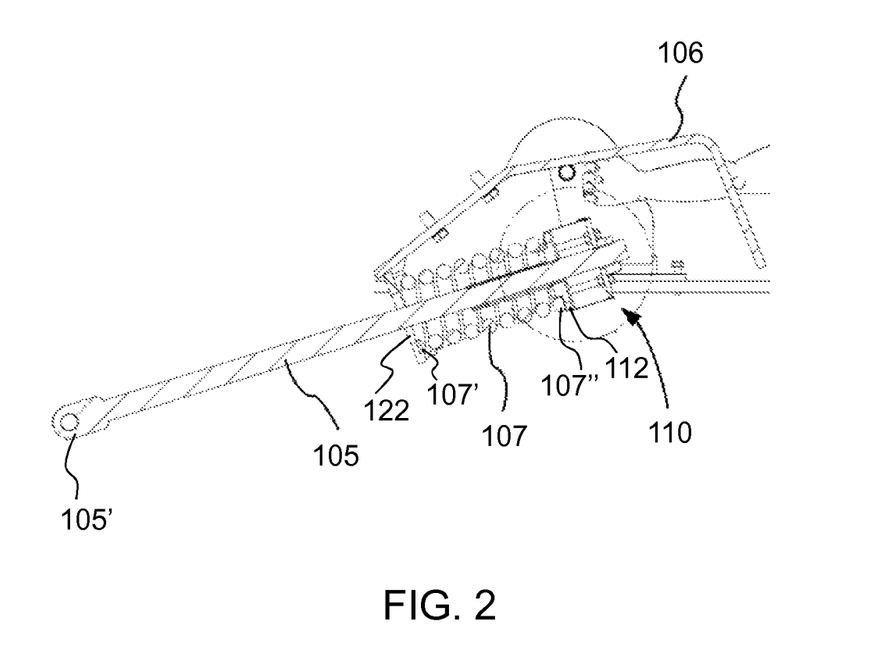
FIG. 2 shows the spring of the tie rod compressed with the tightening device of FIG. 1.

FIG. 2 shows a part of the jaw crusher in FIG. 1 in a longitudinal cross section along the middle line of the tie rod 105. The spring 107 is positioned around the tie rod and compressed with the tightening device 110. The tie rod is supported at its first end 105' by the pendulum and at another location by a first spring support 122 supported by the rear part 108 of the jaw crusher's frame through the spring 107. The spring is installed at its first end 107' against the first spring support 122 fastened to the rear part of the frame. The spring tightening device 110 comprises a second spring support 112 installed against a second end 107" of the spring. The second spring support is supported by the tie rod and moved supported by the tie rod closer to the first spring support.

Figure 3:
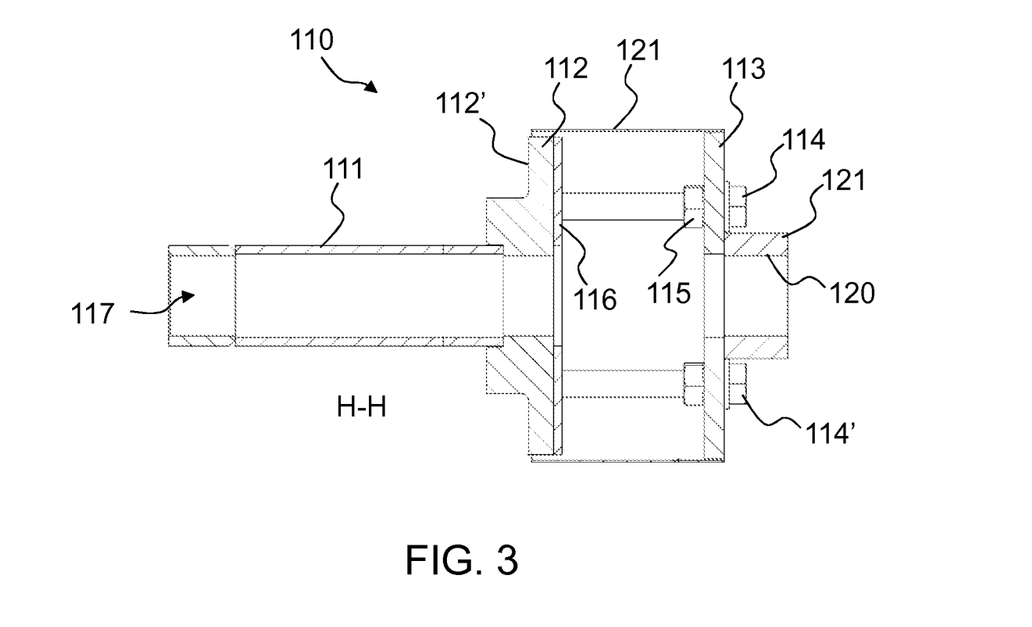
FIG. 3 shows a tightening device according to a preferred embodiment of the invention in a tightened position.

FIG. 3 shows a longitudinal cross section H-H of a tightening device 110 where the tightening device is in a spring compressing position. A second spring support 112 comprises a support surface 112' for the spring 107 on its first side. The tightening device comprises a support part 113 and at least two moving screws 114, 114' supported by the support part and arranged to influence the second spring support 112 from a second side opposite to the first side. The distance between the second spring support and the support part is arranged to be changeable by rotating the at least two moving screws supported by the support part, preferably alternately.

The tightening device comprises threads for moving each moving screw supported by the support part 113 in relation to the support part; in the figure, the threads are arranged in a nut 115 supported by the support part 113. Preferably, the nut is arranged to be non-rotatable in relation to the support part, whereby it suffices to use one tool to rotate the head of a moving screw to move the moving screw. Alternatively, the thread of the moving screw is integrated in the support part.

In some preferred embodiments of the tightening device 110, a guide bushing 111 is fastened to the second spring support 112. When the second spring support is supported by the tie rod through the guide bushing, the second spring support can be kept in a straight position against the spring 107. In addition, the tie rod can be protected against oil and/or dirt by means of the guide bushing.

Preferably, a through hole 117, such as a hole for the tie rod 105, is formed inside the second spring support 112 and the support part 113 placed in succession.

In some embodiments of the tightening device 110, a spacer plate 116 is arranged between the second spring support 112 and the moving screws. Preferably, the spacer plate is made of wear-resistant material, such as hardened steel. This enables reducing the reshaping of material taking place at the contact points of the moving screws' ends.

The tightening device comprises a locking member 120 to support the support part by means of the tie rod. Preferably, a female thread to be fastened to a thread formed at an end of the tie rod 105 is arranged as the locking member 120. In FIG. 2, the locking member comprises a nut that is a locking part 121 separate from the support part 113. Alternatively, the locking member may be integrated in the support part, for example, a female thread formed in the support part.

The locking member 120 fastened to the tie rod may be used to prevent the movement of the support part 113 father away from the first spring support 122. When the second spring support moves farther away from the support part as a result of using the moving screws, the spring compresses, i.e., contracts. When the second spring support moves closer to the support part as a result of using the moving screws, the compression of the spring reduces, i.e., the spring decompresses.

Preferably, the tightening device 110 comprises a protective mantle 121 arranged to surround a space formed between the second spring support 112 and the support part 113 in the entire scope determined by the movement range of the moving screws. According to some preferred embodiments, an additional feature is arranged in the protective mantle 121 through which the protective mantle 121 prevents the distance between the second spring support 112 and the support part from decreasing to a value smaller than desired when the tightening device is in a spring compressing position. The protective mantle is preferably fastened to the support part. During the tightening of the spring, the support part is preferably kept in place by means of the locking member. The protective mantle 121 is dimensioned so that the second spring support moves inside the protective mantle when the moving screws are used.

Figure 4:
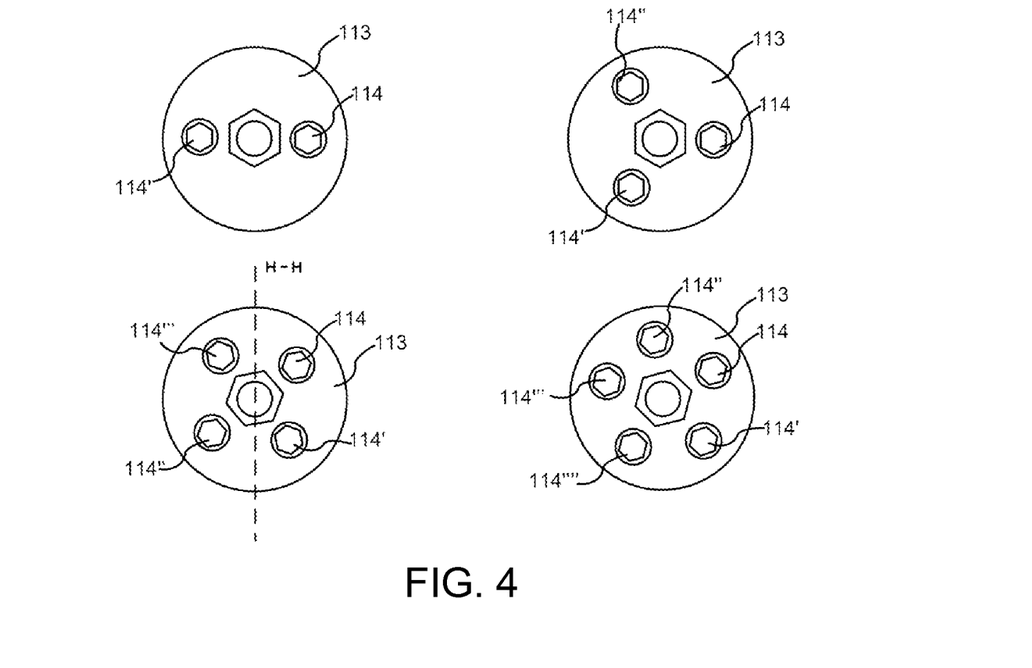
FIG. 4 shows alternative embodiments of the tightening device which include a varying number of tightening screws.

FIG. 4 shows alternative embodiments of the tightening device that include a varying number of tightening screws. An example according to FIG. 3 is shown at lower left in FIG. 4, where four moving screws 114, 114', 114", 114''' can be used to change the distance between the second spring support and the support part. At upper left, a tightening device is shown with two moving screws 114, 114" arranged in its support part 113. At upper right, a tightening device is shown with three moving screws 114, 114", 114''' arranged in its support part 113. At lower right, the tightening device is shown with five moving screws 114, 114', 114", 114''', 114'''' arranged in its support part 113. Naturally, other numbers greater than the two to five moving screws referred to in the examples meet the definition of at least two moving screws.

Preferably, the diameter of the thread of the moving screw 114-114'''' is smaller than the diameter of the thread of the locking member 120 (the tie rod 105). Preferably, the diameter of the thread of the tie rod is 48 mm. Preferably, the diameter of the moving screw is 16 mm. Preferably, the ratio between the diameters of the thread of the tie rod and the threads of the moving screws is 3.

Figure 5:
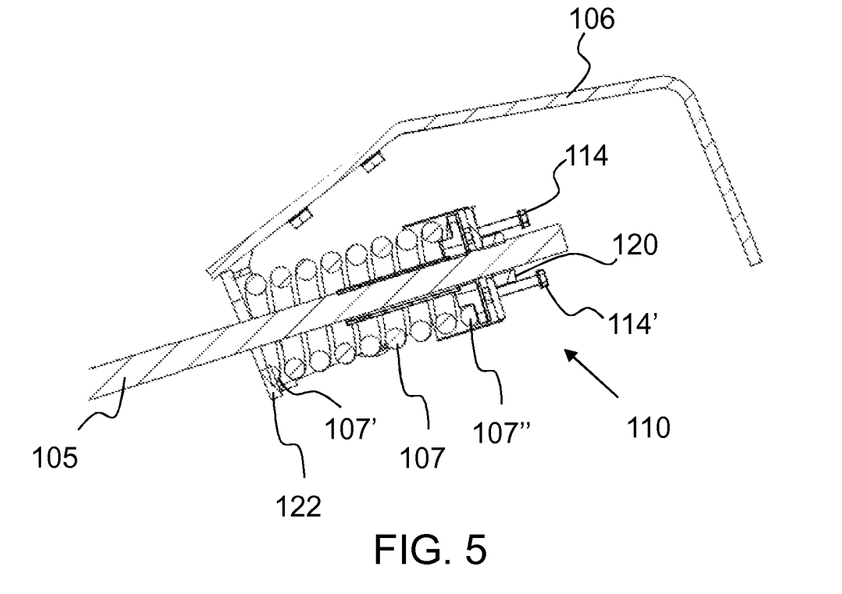
FIG. 5 shows a phase of the tightening of the spring where the tightening device is at a rear position of the movement range.

FIG. 5 shows a phase of the tightening of the spring 107 where the tightening device 110 is at a rear position of the movement range. When the spring is tightened, it is ensured that the moving screws 114-114'''' have a sufficient moving distance to the front direction of the movement range to compress the spring. In such a case, the second spring support and the support part are preferably close to each other, and the moving screws are preferably rotated almost open. The support part 113 is installed around the tie rod. After this, the nut arranged as the locking member 120 is rotated in the thread formed at the end of the tie rod 105 until the spring starts to compress. In this phase, pulled by the tie rod, the pendulum is positioned against the toggle plate, which is positioned against the rear part 108 of the jaw crusher's frame. The ends of the spring 107', 107" are positioned against the spring supports 122,112.

Figure 6:
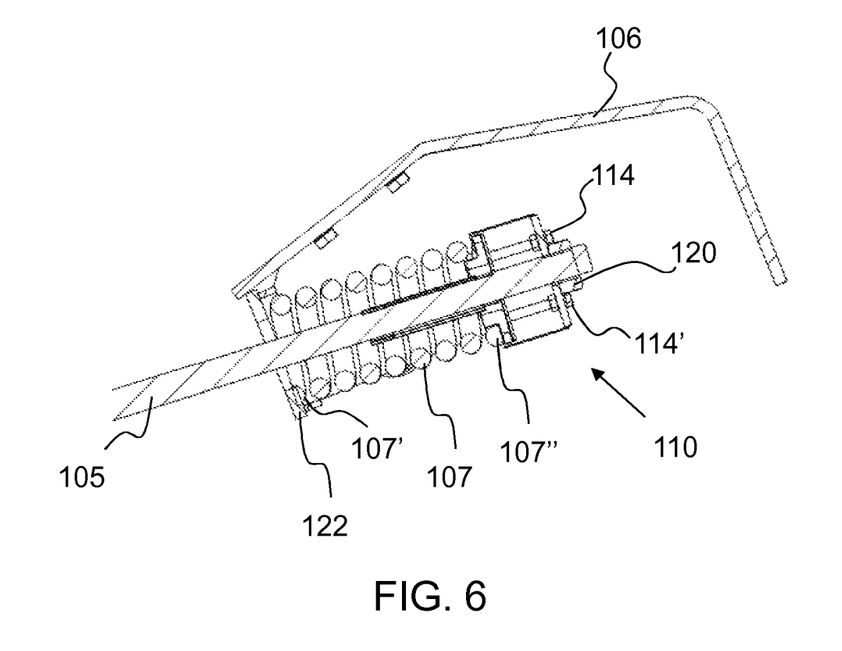
FIG. 6 shows a phase of the tightening of the spring where the tightening device is at a front position of the movement range.

FIG. 6 shows a phase of the tightening of the spring 107 where the tightening device is at the front position of the movement range. The moving screws have been rotated in the first direction for a distance required by the compression of the spring, preferably for the whole moving distance of the moving screws, in which case the spring 107 has contracted by the moving distance of the moving screws.

When the spring 107 is being decompressed, for example, when dismantling the spring from its place, the moving screws 114-114'''' are rotated in a second, opposite direction (compared with the first direction) for a distance required by the decompression of the spring. After this, the nut can be rotated off the tie rod 105 to release the spring.

Figure 7:
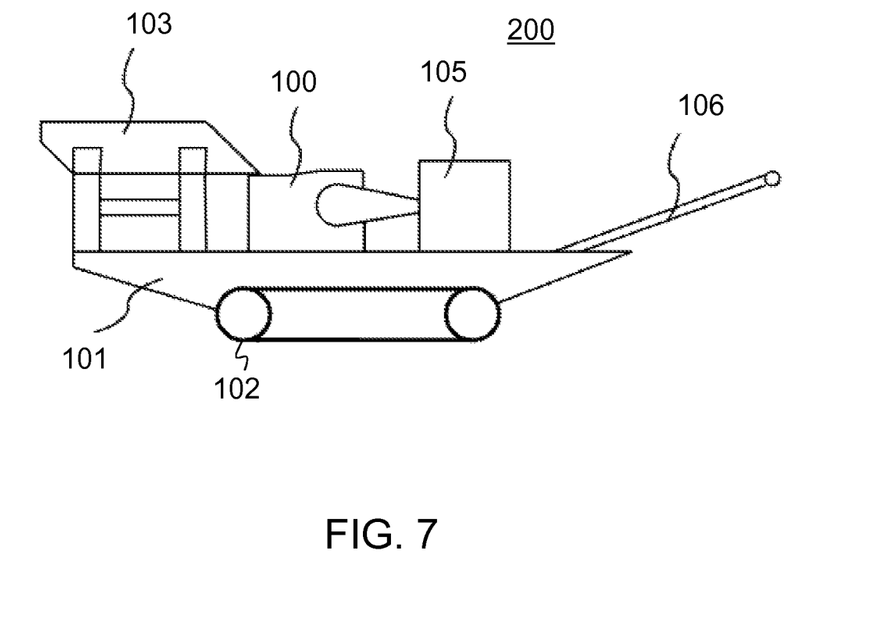
FIG. 7 shows a processing plant of mineral material according to the invention that preferably comprises the crusher in FIG. 1.

FIG. 7 shows a mobile processing plant of mineral material 200 that comprises a feeder 103 for feeding material to a jaw crusher 100 and a belt conveyor 106 for conveying the crushed product farther away from the processing plant. The jaw crusher comprises a tightening device 110 according to an embodiment of the invention. The processing plant 200 also comprises a power supply and a control center 105. The power supply may be a diesel or electric engine, for example, which provides energy for use by process units and hydraulic circuits.

The feeder, crusher, power supply, and conveyor are fastened to a frame 101, which in this embodiment also comprises a track base 102 for moving the processing plant. The processing plant may also be entirely or partly wheel-mounted or movable by feet. Alternatively, it may be movable/towable by means of a truck or other external power supply. In addition to those mentioned above, the processing plant may also be a stationary processing plant.

Without limiting the scope of protection, interpretation, or potential applications of the invention, the improvement of occupational safety can be regarded as a technical advantage of the various embodiments of the invention. Furthermore, facilitation of work and ergonomics can be considered a technical advantage of the various embodiments of the invention. Moreover, the reduction of the force needed for tightening can be considered a technical advantage of the various embodiments of the invention. When the tightening device is used, installation forces are lower than previously. When rotating smaller screws, smaller and lighter tools can be used. Furthermore, the reduction of the space needed for using a tool can be considered a technical advantage of the various embodiments of the invention. In practice, a larger movement can be effected all at once by using a tool, such as a ratchet wrench or ring spanner.

The description presented in the foregoing provides non-limiting examples of some embodiments of the invention. However, it is apparent to those skilled in the art that the invention is not limited to the details presented above, but that the invention may also be implemented in other equivalent ways.

Some features of the embodiments presented may be utilized without employing other features. The above description must be regarded as an explanatory account describing the principles of the invention and not as limiting the invention. Thus the scope of the invention is only limited by the appended claims.

The invention claimed is:

1. A spring tightening device for compressing and decompressing a spring having a first end and a second end and operable for loading a tie rod in a jaw crusher having a frame, which spring tightening device comprises:
   a first spring support configured to be fastened to the frame, the first spring support being positionable such that the first end of the spring being against the first spring support;
   a second spring support configured to be freely movable along and supported by the tie rod and positionable in contact with the second end of the spring;
   a support part configured to be attached to the tie rod, wherein the second spring support is located between the support part and the first spring support;
   at least two moving screws supported by the support part and arranged to move the second spring support to compress or decompress the spring between the first spring support and the second spring support;
   an adjustment nut configured for supporting the support part by the tie rod and for adjusting the position of the support part relative to the tie rod;
   wherein a distance between the second spring support and both the first spring support and the support part is arranged to be changeable by rotating the at least two moving screws supported by the support part,
   wherein the distance between the second spring support and both the first spring support and the support part is arranged to be changeable by rotating the adjustment nut,
   wherein when the spring is in a compressed condition between the first spring support and the second spring support, the distance between the first spring support and the second spring support is adjusted only by the adjustment nut or the moving screws; and
   the spring tightening device further comprises a guide bushing fastened to the second spring support and is arranged to support the second spring support in relation to the tie rod in a straight position against the spring.

2. The spring tightening device according to claim 1, wherein the adjustment nut includes a female thread that is configured to engage the tie rod.

3. The spring tightening device according to claim 1, further comprising threads for moving each moving screw supported by the support part in relation to the support part, which threads are arranged in the support part or a nut supported by the support part.

4. The spring tightening device according to claim 1, further comprising a spacer plate between the second spring support and the at least two moving screws supported by the support part.

5. The spring tightening device according to claim 1, wherein the tightening device comprises a tie rod guide bushing fastened to the second spring support.

6. The spring tightening device according to claim 1, wherein the at least two moving screws consist of two; or three; or four; or five moving screws arranged in the support part.

7. The spring tightening device according to claim 2, wherein a diameter of the thread of the at least two moving screws is smaller than a diameter of the thread of the adjustment nut.

8. The spring tightening device according to claim 1, wherein a length of the at least two moving screws is chosen so that a moving distance of the moving screw from a rear position to a front position causes the compression required of the spring.

9. A jaw crusher comprising:
   a pendulum;
   a toggle plate, the pendulum being supported to a frame of the crusher through the toggle plate;
   a tie rod fastened between the pendulum and the frame of the jaw crusher;
   a spring having a first end and a second end and operable for loading the tie rod and pulling the pendulum with the tie rod against the toggle plate; and
   a tightening device comprising:
   a first spring support fastened to the jaw crusher's frame, the first spring support being installed such that a first end of the spring is against the first spring support;
   a second spring support configured to be freely movable along and supported by the tie rod against which the second end of the spring is in contact;
   a support part attached to the tie rod, wherein the second spring support is located between the support part and the first spring support;
   at least two moving screws supported by the support part and arranged to move the second spring support to compress or decompress the spring between the first spring support and the second spring support; and
   an adjustment nut for supporting the support part by the tie rod and for adjusting the position of the support part relative to the tie rod;
   wherein the distance between the second spring support and both the first spring support and the support part is arranged to be changeable by rotating the at least two moving screws supported by the support part,
   wherein the distance between the second spring support and both the first spring support and the support part is arranged to be changeable by rotation of the adjustment nut;
   wherein when the spring is in a compressed condition between the first spring support and the second spring support, the distance between the first spring support and the second spring support is adjusted only by the adjustment nut or the moving screws; and the spring tightening device further comprises a guide bushing fastened to the second spring support and is arranged to support the second spring support in relation to the tie rod in a straight position against the spring.

10. A processing plant of mineral material, comprising a jaw crusher according to claim 9.

* * * * *